US008892488B2

(12) United States Patent
Qi et al.

(10) Patent No.: US 8,892,488 B2
(45) Date of Patent: Nov. 18, 2014

(54) DOCUMENT CLASSIFICATION WITH WEIGHTED SUPERVISED N-GRAM EMBEDDING (75) Inventors: Yanjun Qi, Princeton, NJ (US); Bing Bai, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 373 days.

(21) Appl. No.: 13/483,868

(22) Filed: May 30, 2012

(65) Prior Publication Data
US 2012/0310627 A1 Dec. 6, 2012

Related U.S. Application Data (60) Provisional application No. 61/492,228, filed on Jun. 1, 2011, provisional application No. 61/647,012, filed on May 15, 2012.

(51) Int. Cl.
G06F 17/00 (2006.01)
G06N 5/00 (2006.01)
G06F 17/27 (2006.01)

(52) U.S. Cl.
CPC .................. G06F 17/2785 (2013.01)
USPC .......................................................... 706/45

(58) Field of Classification Search
None
See application file for complete search history.

(56) References Cited

U.S. PATENT DOCUMENTS 5,835,087 A * 11/1998 Herz et al. .................... 715/810
7,359,851 B2 * 4/2008 Tong et al. ........................ 704/8

2010/0185659 A1 * 7/2010 Bai et al. ....................... 707/769
2012/0150532 A1 * 6/2012 Mirowski et al. ................. 704/9
2012/0253792 A1 * 10/2012 Bespalov et al. ................ 704/9

OTHER PUBLICATIONS

A Unified Architecture for Natural Language Processing: Deep Neural Networks with Multitask Learning Ronan Collobert Jason Weston NEC Labs America, 4 Independence Way, Princeton, NJ 08540 USA.*
Bespalov, D., et al. "Sentiment Classification Based on Supervised Latent N-Gram Analysis" Proceedings of the 20th ACM Conference on Information and Knowledge Management (CIKM'11). Oct. 2011. pp. 375-382.
Bottou, L. "Stochastic Learning" Advanced Lectures on Machine Learning. Feb. 2003. pp. 153-174.
Cavner, W., et al. "N-Gram-Based Text Categorization" Symposium on Document Analysis and Information Retrieval, 1994. (14 Pages).
Collobert. R., et al. "A Unified Architecture for Natural Language Processing: Deep Neural Networks with Multitask Learning" Proceedings of the 25th International Conference on Machine Learning, ICML 2008. Jun. 2008. (8 Pages).
Deerwester, S., et al. "Indexing by Latent Semantic Analysis" Journal of the American Society for Information Science (JASIS), vol. 41, No. 6. Sep. 1990. pp. 391-407.

(Continued)

*Primary Examiner* — Kakali Chaki
*Assistant Examiner* — Ababacar Seck
(74) *Attorney, Agent, or Firm* — Joseph Kolodka (57) ABSTRACT Methods and systems for document classification include embedding n-grams from an input text in a latent space, embedding the input text in the latent space based on the embedded n-grams and weighting said n-grams according to spatial evidence of the respective n-grams in the input text, classifying the document along one or more axes, and adjusting weights used to weight the n-grams based on the output of the classifying step.

18 Claims, 5 Drawing Sheets (56) References Cited

OTHER PUBLICATIONS

Jing, H., et al. "A General Framework of Feature Selection for Text Categorization" Proceedings of the 6th International Conference on Machine Learning and Data Mining in Pattern Recognition, MLDM '09. Jul. 2009. pp. 647-662.

Lazebnik, S., et al. "Beyond Bags of Features: Spatial Pyramid Matching for Recognizing Natural Scene Categories" 2006 IEEE Computer Society Conference on Computer Vision and Pattern Recognition (CVPR 2006), Jun. 17-22, 2006. pp. 2169-2178.

Lebanon, G., et al. "The Locally Weighted Bag of Words Framework for Document Representation" Journal of Machine Learning Research, vol. 8. Oct. 2007. pp. 2405-2441.

Leslie, C.S., et al. "Mismatch String Kernels for SVM Protein Classification" Neural Information Processing Systems (NIPS). Dec. 2002. pp. 1417-1424.

Sauper, C., et al. "Incorporating Content Structure into Text Analysis Applications" Proceedings of the 2010 Conference on Empirical Methods in Natural Language Processing (EMNP 2010). Oct. 2010. pp. 377-387.

Weston, J., et al. "Large Scale Image Annotation: Learning to Rank With Joint Word-Image Embeddings" Machine learning, vol. 81, No. 1. Oct. 2010. pp. 21-35.

Wilson, T., et al. "Recognizing Contextual Polarity in Phrase-Level Sentiment Analysis" Proceedings of Human Language Technology Conference and Conference on Empirical Methods in Natural Language Processing. Oct. 2005. (8 Pages).

\* cited by examiner

DOCUMENT CLASSIFICATION WITH WEIGHTED SUPERVISED N-GRAM EMBEDDING

RELATED APPLICATION INFORMATION

This application claims priority to provisional application Ser. No. 61/492,228 filed on Jun. 1, 2011, incorporated herein by reference. The application further claims priority to provisional application Ser. No. 61/647,012, filed on May 15, 2012, incorporated herein by reference.

BACKGROUND

1. Technical Field

The present invention relates to document classification and, more particularly, to document classification using supervised weighted n-gram embedding.

2. Description of the Related Art

The task of document classification is defined as automatic assignment of one or more categorical labels to a given document. Examples of document classification include topic categorization, sentiment analysis, and formality studies. A document may include a sentence, paragraph, or any snippet of text—the term is defined herein to encompass all such objects.

Previous techniques applied to this task are either generative or discriminative supervised methods. Discriminative document classification techniques commonly rely on the so-called "bag-of-words" (BoW) representation that maps text articles of variable lengths into a fixed-dimensional vector space, parameterized by a finite vocabulary. The BOW model treats a document as an unordered collection of word-features and utilizes the distribution of the words as the primary evidence for its classification. The "bag-of-unigrams" is the most common form of BoW representation that utilizes a word dictionary as its vocabulary.

Some classification attempts have employed short phrases as being more effective than single words (unigrams) for the task. Extending the "bag-of-unigrams" model by incorporating n-grams (a contiguous sequence of n words in the vector space representation of the text). However, the complexity of modeling n-grams grows exponentially with the dictionary size. Considering the n-gram cases for an English word dictionary $\mathcal{D}$ of size $|\mathcal{D}|$, bi-gram and trigram representations of text relate to $|\mathcal{D}|^2$ and $|\mathcal{D}|^3$ free parameters.

Despite the simplicity and relative success of document classification using n-gram features, previous models disregard all the spatial and ordering information of the n-grams—such information is important for text data. In the example of sentiment analysis, phrases with strong polarity might be more important in deciding the polarity of the whole document. For example, a document with the phrase "generally good" at its beginning is very likely to be a positive sentiment. When the same phrase appears in the middle of another text, the document is less likely to be a positive comment. Similarly, the start and the end of sentences or paragraphs in an on-line news article might contain more critical and subjective information than its other parts. To completely capturing such relationships would require full semantic understanding, which is beyond the current state of technology.

SUMMARY

A method for document classification includes embedding n-grams from an input text in a latent space; embedding the input text in the latent space based on the embedded n-grams and weighting said n-grams according to spatial evidence of the respective n-grams in the input text; classifying the document along one or more axes using a processor; and adjusting weights used to weight the n-grams based on the output of the classifying step.

A system for document classification includes an n-gram embedding module configured to embed n-grams from an input text in a latent space; a document embedding module configured to embed the input the input text in the latent space based on the embedded n-grams, weighted according to spatial evidence of the respective n-grams in the input text; a classifier configured to classify the document along one or more axes using a processor; and a weight learning module configured to adjust the weights for the n-grams based on the output of the classifying step.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a unified deep learning framework for using high-order n-grams and for exploring spatial information. This goes beyond the bag-of-words (BOW) strategy for document classification. First, a supervised embedding mechanism is provided to directly model n-grams in a low-dimensional latent semantic space. Then, to achieve a fine-grained model of target documents, a controller module is trained by spatially re-weighting the sub-parts of each document. The document representation is then provided to a classifier that is trained for target classification tasks. A deep neural network learns the parameters of the latent space, the article modeling layers, and the classifier jointly in one end-to-end discriminative framework.

Compared to BON strategy using feature selection or the n-gram embedding based method, an advantage of the present principles is that, the whole-document modeling using the controller module provides a spatial weighting scheme for different subparts using the supervised classification signals. All layers are optimized for the target task and need little human intervention, thereby making the system totally adaptable for other tasks.

Before addressing the particulars of the present principles, the following notations are used throughout. $\mathcal{D}$ denotes an underlying word (unigram) dictionary and S denotes the set of all finite length sequences of words from $\mathcal{D}$. The operator $|.|$ denotes the cardinality of a set. An input text sequence of length N will be denoted as $x=(w_1, \ldots w_N)$, where $w_j \in \mathcal{D}$, $x \in S$ and j indicates the j-th position in x. Formally, the basic BOW representation applies a mapping $\phi(\bullet)$ to a text string x and converts it into a feature space of fixed dimension (e.g., $|\mathcal{D}|$). It is in this space that a standard classifier such as linear perceptron or support vector machine can be applied. The mapping $\phi:S \to R^M$ takes words sequences in S and maps them to a finite dimension feature space. The document labels form a set $\mathcal{Y}=\{1,K,C\}$. For example, C=2 denotes sentiment classes such as "positive" or "negative." A labeled training-set with training labels from $\mathcal{Y}$ is denoted as $X = \{\{(x_i,y_i)\}_{i=I,K,L} | x_i \in S, y_i \in \mathcal{Y}|\}$.

Figure 1:
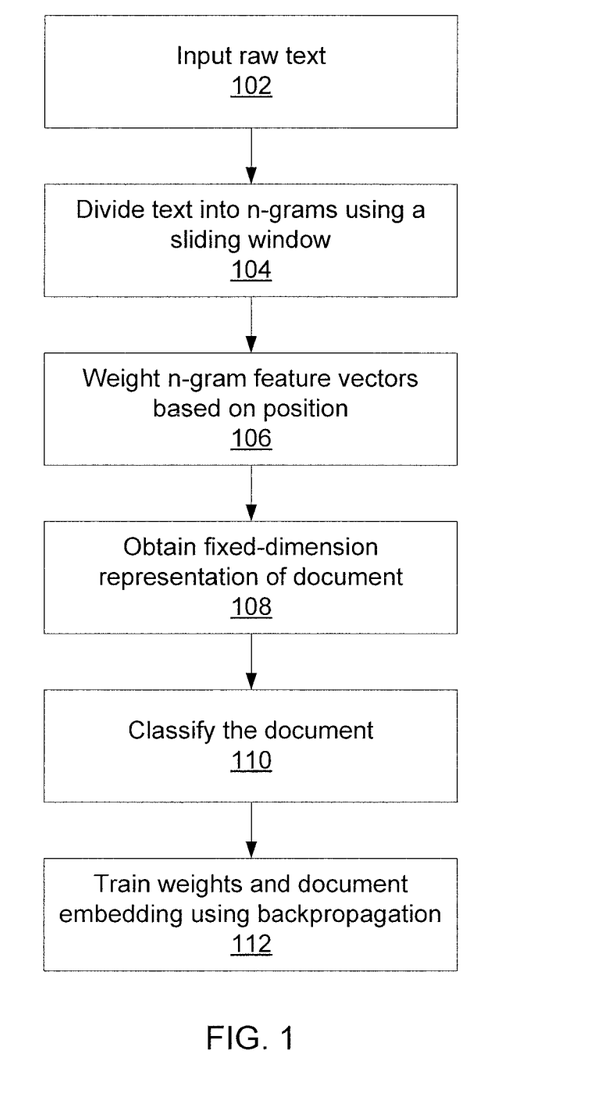
FIG. 1 is a block/flow diagram of a method for document classification according to the present principles.

Referring now to FIG. 1, a diagram showing a method for document classification is provided. Block 102 inputs the raw text of the document. As noted above, this document may be a text sequence of any length broken into a set of unigrams separated by some appropriate token (e.g., a space or punctuation). Block 104 uses a sliding window to divide text into n-grams, creating one n-gram for each set of n consecutive words in the document. Each n-gram has a corresponding feature vector that characterizes the n-gram.

Block 106 uses factors to weight the n-gram vectors according to where each n-gram is located within the document. For example, n-grams that are located near the beginning or end of the document may have greater weight than those n-grams located in the middle. Block 108 uses the weighted vectors to obtain a fixed-dimension representation of the document, a process called "embedding." The resulting vector representation of the text document is used in block 110 to classify the document according to a predetermined classification system. For example, a classifier may discriminate between "positive" and "negative" statements, or may instead use any well-defined classification system. Block 112 uses the results of the classification to "backpropagate" and train the weights and document embeddings used in blocks 106 and 108.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present principles are exemplified using common text classification tasks: sentimental text binary classification and news text categorization. Sentimental text binary classification predicts a binary sentiment, positive or negative, expressed by a given document, whereas news text categorization predicts the semantic class a news text piece belongs to.

To overcome the dimensionality burdens that high-order models impose, the present principles project n-grams to a low-dimensional latent semantic space at block 104 using only unigram word dictionaries. Associated parameters are estimated with a bias for target classification. This projection of n-grams can be performed with a word embedding or with direct phrase embedding.

$\Gamma$ denotes the vocabulary of n-grams in an input corpus, with each n-gram $\gamma_j=(w_{j+1}, \ldots, w_{j+n-1})$, where j indicates the j-th position in the input document x. In a bag-of-unigrams representation, the function $\phi(x)$ would map the input x in a natural way as a (sparse) vector of dimensionality $M=|\mathcal{D}|$. Similarly, in a bag-of-ngrams, the function $\phi(x)$ maps x to a vector $M=|\Gamma|$-dimensional representation, with $|\Gamma|= O(|\mathcal{D}|^n)$. Using a sparse vector representation, a unigram word $w_j$ can be described as a vector $$e_{w_j} = (0, \ldots, 0, \underset{at\ index\ w_j}{1}, 0, \ldots, 0)^T,$$

with an n-gram vector $e_{\gamma_j}=[e_{w_j}^T, e_{w_{j+1}}^T, \ldots, e_{w_{j+n-1}}^T]^T$ being an $n|\mathcal{D}|$-dimensional sparse vector that concatenates vectors of words in the n-gram according to their linear ordering.

Figure 2:
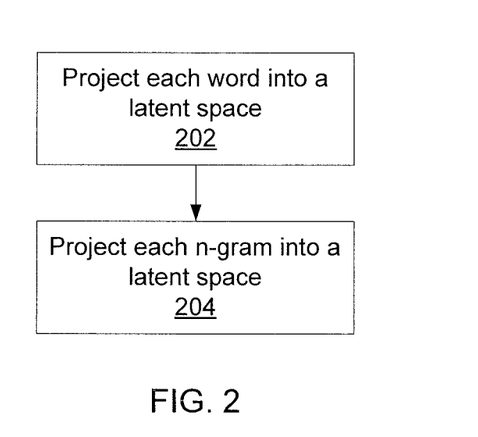
FIG. 2 is a block/flow diagram of a method for embedding n-grams in a latent space.

Referring now to FIG. 2, a method for embedding n-grams with word embedding is shown. In word embedding, because individual words carry significant semantic information, a mapping of each word is projected into a real-valued vector space in block 202. Specifically, each word $w_j \in \mathcal{D}$ is embedded into an m-dimensional feature space using a lookup table $LT_E(.)$ defined as $$LT_E(w_j) = E \times e_{w_j} = E \times (0, \ldots 0, \underset{at\ index\ w_j}{1}, \ldots, 0)^T = E_{w_j}, \quad (1)$$

where $E \in R^{m \times |\mathcal{D}|}$ is a matrix with word embedding parameters to be learned. Here, $E_{w_j} \in R^m$ is the embedding of the word $w_j$ in the dictionary $\mathcal{D}$ and m denotes the target word embedding dimensionality. It is important to note that the parameters of E are automatically trained during the learning process using backpropagation, discussed below. An M-dimensional representation of each n-gram is made up of the n individual m-dimensional embedding vectors that make up the phrase.

This formation of n-grams is carried through a sliding window of length n. Given an n-gram $\gamma_j$ of n adjacent words at the position j, in block 204 the word lookup table layer applies the same operation for each word inside the n-gram, producing $z_{\gamma_j} = [E_{w_j}^T, E_{w_{j+1}}^T, \ldots, E_{w_{j+n-1}}^T]^T$ as an operator that concatenates embeddings of words in the n-gram $\gamma_j$, resulting in an nm-dimensional vector $z_{\gamma_j}$. The embedding of the $\gamma_j$ can then be defined as $$p_{\gamma_j} = h(F \times z_{\gamma_j}) = h(F \times [E_{w_j}^T, E_{w_{j+1}}^T, \ldots E_{w_{j+n-1}}^T]^T), \quad (2)$$

where projection matrix $F \in R^{M \times nm}$ maps the vector z into an M-dimensional latent space and $h(\cdot) = \tan h(\cdot)$. The h( ) function is not limited to the hyperbolic tangent, but may instead be any appropriate function that converts an unbounded range into a range from −1 to 1. In this manner, word-based embedding constructs a low-dimensional latent embedding for all phrases $\gamma_j \in x$ by first projecting teach word into a latent space in block 202, followed by a second projection to obtain the latent embedding of each n-gram in block 204.

With the goal of classifying the whole document into certain classes, the whole-document may be represented based on its included n-grams. The structured spatial patterns in natural language text could not be captured by the unstructured "bag" assumption of BOW.

The n-gram embedding computes a low-dimensional representation of all n-grams in a given text. Some function $\phi(\cdot)$ is used to compress the information in a text document of variable length to a finite dimension feature space (a document embedding vector). The class prediction for an input text is then computed using a function $g(\cdot)$, defined in the resulting low-dimensional space. While there are many possibilities to combine latent n-grams into a document embedding vector, an averaging strategy is described herein. Formally, the document representation is defined as:

$$\phi(x) \equiv d_x = \frac{1}{N} \sum_{j=1}^{N} p_{\gamma_j} \quad (3)$$

where $d_x \in R^M$ and $x = (w_1, \ldots, w_N)$. In other words, $d_x$ is the centroid of the vector associated with n-grams of the document x. Using sentiment classification as a test case, the sentiment polarity of a document is intuitively related to the aggregated semantic or polarity of all its n-grams. In other words, the more positive n-grams present in the document, the more likely it is for the document to express a positive opinion. While there are many possibilities for the aggregation function, a mean value function provides a good summarization of the document's sentiment in this latent space. One can also use a maximizing function that selects the maximum value along each latent dimension.

Figure 3:
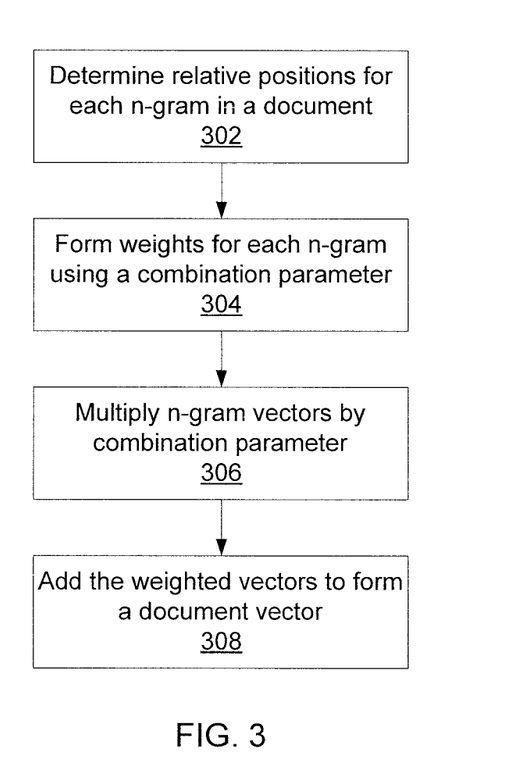
FIG. 3 is a block/flow diagram of a method for weighting n-grams to model a document according to the present principles.

Referring to FIG. 3, a method for reweighting n-grams to model a document is shown. The function $\phi(\cdot)$ is implemented herein as a weighted sum. The weights for each n-gram $\gamma_j \in x$ are learned based on the n-gram's position in the text, as determined in block 302. The weights are used to combine the latent embeddings of $\gamma_j$ into a document-level representation. Specifically, a latent embedding of document x in the latent space is defined as:

$$\phi(x) \equiv d_x = \sum_{j=1}^{N} q_j \times p_{\gamma_j}, \quad (4)$$

where $d_x \in R^M$, $x = (w_1, \ldots, w_N)$, and $h(\cdot) = \tan h(\cdot)$. The convex combination parameter for the phrase $\gamma_j$ is initially defined as $q_j = 1/N$, and is subsequently learned based on the location of the phrase $\gamma_j$ in block 304. The weight of every $\gamma_j$ is modeled as a scalar $q_j$ using the following mixture model. Let $\gamma_j \in x$, $|x| = N$ and $j \in \{1 \ldots N\}$ indicate the position of an n-gram in x, and define the weight associated with $\gamma_j$ as:

$$q_j = \frac{1}{Q} \sum_{k=1}^{K} \text{sigmoid}\left(a_k \cdot \frac{j}{N} + b_k\right), \quad (5)$$

where $a_k, b_k$ are parameters to be learned, $$Q = \sum_{j=1}^{N} q_j,$$

K specifies the number of mixture quantities, and sigmoid($\cdot$) is a non-linear transfer function. The spatial re-weighting attempts to capture longer "trends" within each document and preserves spatial information for phrases within a document. The parameters in equation 5 include two vectors, a and b. They are learned/identified by a "backpropagation" training process. The n-gram vectors $p_{\gamma_j}$ are each multiplied by their respective combination parameters $q_j$ in block 306, and combined in block 308 to form the document vector $d_x$.

An alternative embodiment for modeling the weight of every $\gamma_j$ is to use both the position evidence and the content of this n-gram. Let $\gamma_j \in x$, $|x| = N$ and $j \in \{1 \ldots N\}$ indicate the position of an n-gram in x. Utilizing another linear project layer as, $$q_j = h\left(B \times \left[\frac{j}{N_x}, p_{\gamma_j}\right]\right), \quad (6)$$

where the projection matrix $B \in R^{(M+1) \times 1}$ maps the vector $$\left[\frac{j}{N_x}, p_{\gamma_j}\right]$$

(concatenating relative position and the n-gram representation) into a scalar and $h(\cdot) = \tan h(\cdot)$. The resulting weight value $q_j$ for phrase $\gamma_j$ considers not only the spatial evidence, but also the n-gram itself. The parameters in equation 6 include the projection matrix B which is identified (learned) by the "backpropagation" training process.

Figure 5:
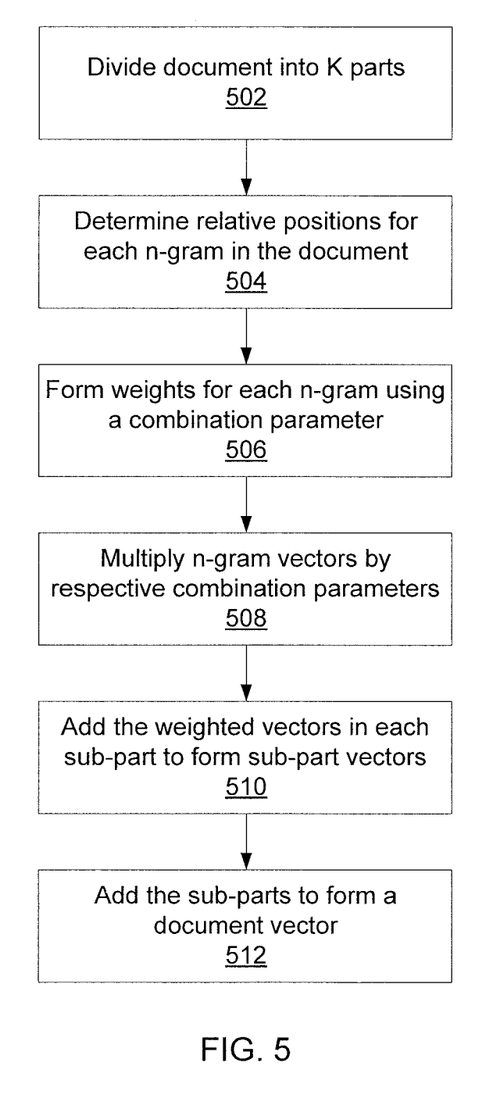
FIG. 5 is a block/flow diagram of an alternative embodiment of weighting n-grams according to the present principles.

Referring now to FIG. 5, an alternative embodiment for modeling the spatial evidence in a document is shown. This method models longer sequence patterns. Considering the fact that text documents have variable length, each document is uniformly split into K equal subparts according to an original linear ordering in block 502. In the present example, K=4, but it is contemplated that any appropriate division may be used. Given a document $x = (w_1, \ldots, w_N)$ with N words, where $w_j$ describes the word at the position j, the split produces:

$$x = (w_1, \ldots, w_N) = [x_1, x_2, \ldots, x_k, \ldots x_K],$$

where the notation [$\cdot$] denotes the concatenation of subsequences into an N-dimensional vector. For $k \in \{1, \ldots K\}$, it can be shown that $$x_k = \left(w_{(k-1)\lfloor \frac{N}{K} \rfloor+1}, K, w_{k\lfloor \frac{N}{K} \rfloor}\right).$$

As with FIG. 3, for each sub-part, block 504 determines relative positions for the n-grams in the document, block 506 weights the n-grams using a combination parameter, block 508 multiplies the n-gram vectors by their respective combination parameters, and block 510 adds the weighted vectors in each sub-part to form sub-part vectors. As above, equation 6 may be used to calculate the sub-part embedding representations $p_k^T$, with the representation of the whole-document being defined as, $$d_x = h([p_1^T, p_2^T, \ldots p_K^T]^T) \tag{7}$$

which is a vector having size KM. The document vector is built from the concatnation of the embedding vectors from its K subsequences in block 512. This captures even "long range" spatial patterns, where each subsequence is normally much longer than a typical n-gram. Also the concatnation operation keeps the original linear ordering between subsequences that are useful for the classification of a document.

Document classification in block 110 may be performed using a linear projection function. Given the document embedding $d_x$, and C candidate classes, W represents a linear projection matrix which projects the embedding representation into a vector with size C. The output vector from this classifier layer is, $$g(x) = (W \times d_x) \tag{8}$$

The predicted class label can be calculated as $$\operatorname*{argmax}_{i \in \{1 \ldots C\}}(g(x)_i^T).$$

This predicted class belongs to one of the candidate classes $\{1 \ldots C\}$.

The last layer is measurement of how different the predicted class of a document compares to its true class label:

$$l(x, y_{TRUE}) = -\log \frac{\exp(g(x)_{y_{TRUE}}^T)}{\sum_{i \in \{1 \ldots C\}} \exp(g(x)_i^T)} \tag{9}$$

The whole network is trained by minimizing the loss function summing over a set of training examples which includes a number of documents and their true class labels $X = \{\{(x_i, y_i)\}_{i=1,K,L} | x_i \in S, y_i \in Y\}$. The training procedure tries to search for the parameters (Table 1 below) to optimizes the following total loss (commonly named the "negative log likelihood" loss), $$L(X) = \sum_{(x_i, y_i) \in X} l(x_i, y_i)$$

Stochastic gradient descent (SGD) may be used to optimize the above loss. In SGD, for a training set X, instead of calculating a true gradient of the objective with all the training samples, the gradient is computed with a randomly chosen training sample $(x, y_{TRUE}) \in X$ with all parameters being updated to optimize equation 9. SGD optimization method is scalable and proven to rival the performance of batch-mode gradient descent methods when dealing with large-scale datasets.

Backpropagation is used to optimize the loss function and learn the parameters (called "training") of each layered module of the network. Each step of the network (word embedding, n-gram embedding, spatial re-weighting, and classification) can be written more generally as a set of functions, $l_x = f_T(f_{T-1}(\ldots(f_1(x))\ldots))$, where $l_x$ denotes a loss on a single example x, and the first layer $f_T$ is the loss function defined above in equation 9, evaluated using a single training example x. Each function has a set of parameters $\theta_i$ as described in Table 1. For example, $\theta_1 = \{E\}$, $\theta_2 = \{F\}$, and $\theta_4 = \{W\}$ or $\theta_4 = \{a, b\}$. The overall system can be represented in a 6-layer network architecture (T=6):

TABLE 1

| Level | Layer | Parameters to Learn | | Associated Equation | |
|---|---|---|---|---|---|
| $f_1$ | word embedding | E | | Eq(1) | |
| $f_2$ | n-gram embedding | F | | Eq(2) | |
| $f_3$ | Transfer layer - tanh | — | | — | |
| $f_4$ | Spatial re-weighting of ngrams (document representation) | $\{a, b\}$ | B | Eq(5) | Eq(6) |
| $f_5$ | classifier | W | | Eq(8) | |
| $f_6$ | loss function | — | | — | |

Table 1

Each parameter listed in Table 1 corresponds to a parameter from one of the above equations. In particular, the parameter E is used in equation 1, the parameter F is used in equation 2, the parameters a and b are used in equation 5, the parameter B is used in equation 6, and the parameter W is used in equation 8.

For a layer $f_i$, $i \in [1, T]$, the derivative $$\frac{\partial l}{\partial \theta_i}$$

is used for updating its parameter set $\theta_i$ uses the delta rule $$\theta_i \leftarrow \theta_i - \lambda \cdot \frac{\partial l}{\partial \theta_i}$$

where $\lambda$ is a small constant called learning rate which influences the speed of learning the parameters. The delta rule is derived through gradient descent which tries to optimize the parameters by minimizing the error (loss) in the output of each single-layer module. It can be seen that:

$$\frac{\partial l}{\partial \theta_i} = \frac{\partial f_T}{\partial f_i} \times \frac{\partial f_i}{\partial \theta_i},$$

and the first factor on the right can be recursively calculated:

$$\frac{\partial f_T}{\partial f_i} = \frac{\partial f_T}{\partial f_{i+1}} \times \frac{\partial f_{i+1}}{\partial f_i}, \text{ where}$$

$$\frac{\partial f_T}{\partial f_{i+1}} \text{ and } \frac{\partial f_i}{\partial \theta_i}$$

are Jacobian matrices. Backpropagation is a generalization of the delta rule which provides an efficient strategy to perform parameter learning and optimizing multi-layered network modules together.

Figure 4:
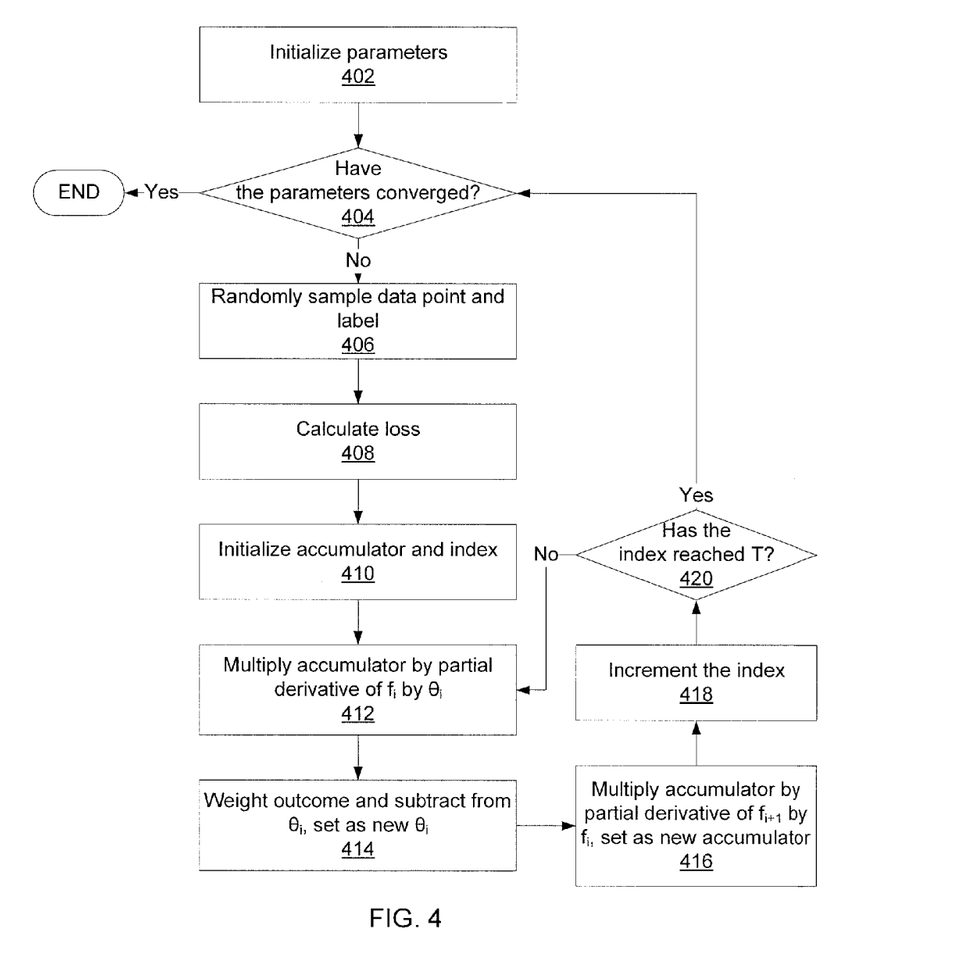
FIG. 4 is a block/flow diagram of a training procedure that produces weights for document embedding according to the present principles.

Referring now to FIG. 4, a training procedure is shown that sets the weights described above. Block 402 initializes the parameters $\theta_i$ for the associated functions $f_i$. Decision block 404 marks the determination of whether the parameters have converged. If the parameters have converged, then training ends. If not, block 406 randomly samples a data point and label in the text document. Block 408 calculates the loss l based on the randomly sampled data point and label.

Block 410 begins a loop by initializing an iterator index i to zero and an accumulator variable to one. Block 412 multiplies the accumulator by $$\frac{\partial f_i}{\partial \theta_i}$$

and stores that value as $$\frac{\partial l}{\partial \theta_i}.$$

Block 414 weights $$\frac{\partial l}{\partial \theta_i}$$

by a factor λ and subtracts the weighted value from the parameter $\theta_i$, storing the updated parameter. Block 416 multiplies the accumulator by $$\frac{\partial f_{i+1}}{\partial f_i}$$

and stores the value as the new accumulator. Block 418 increments i, and decision block 420 determines whether to continue the loop based on whether all of the T layers have been updated. If not, processing returns to block 412. If so, processing returns to block 404 to determine whether the updated parameters have converged. The overall loop may be performed any number of times, whether until convergence or until a maximum number of iterations has been reached.

Figure 6:
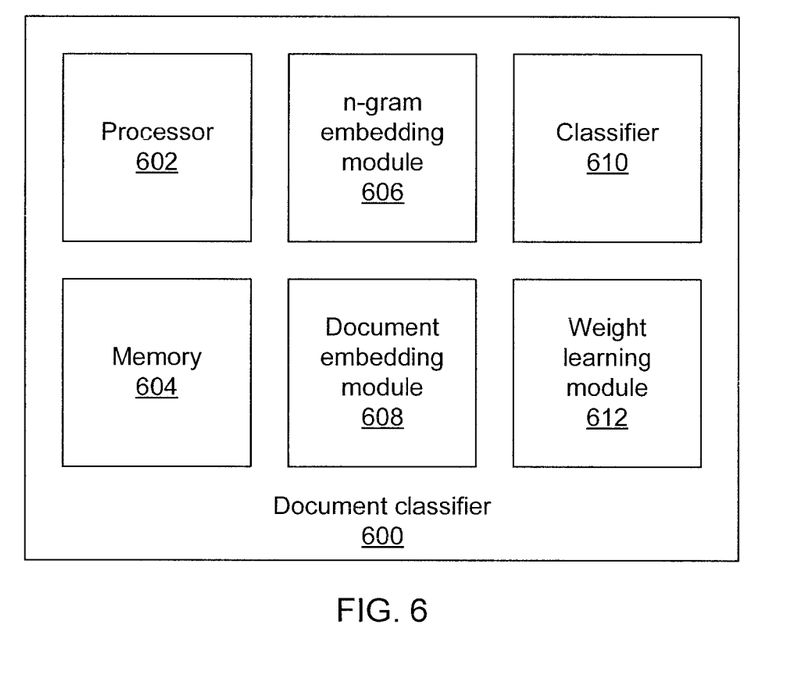
FIG. 6 is a diagram of a system for document classification according to the present principles.

Referring now to FIG. 6, a system for document classification 600 is shown. The system includes a processor 602 and memory 604, which store and process input text to produce classifications. The memory 604 furthermore stores training sets of text to be used by weight learning module 612. An n-gram embedding module 606 embeds sets of n input words from the input text to the latent space, while document embedding module 608 combines the output of the n-gram embedding module to form a document vector using weights for each n-gram, based on the position of those n-grams in the text. Classifier 610 uses the document vector, which characterizes the entire document, to classify the document as belonging to one or more classes. The weight learning module 612 initializes the weights used to embed the document and adjusts those weights based on learning training documents and on the output of the classifier 610.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for document classification, comprising:
embedding n-grams from an input text in a latent space;
embedding the input text in the latent space based on the embedded n-grams and weighting the n-grams according to a non-linear function $$q_j = \frac{1}{Q} \sum_{k=1}^{K} sigmoid\left(a_k \cdot \frac{j}{N} + b_k\right),$$

using a mixture model on a relative position of the n-grams in the input text, where $a_k$ and $b_k$ are parameters to be learned, $$Q = \sum_{j=1}^{N} q_j$$

and K specify a number of mixture quantities, sigmoid (•) is a non-linear transfer function, $q_j$ is the weight associated with a $j^{th}$ n-gram, j signifies the position of an n-gram in the input text, and N is the position of a final n-gram in the input text;
classifying the document along one or more axes using a processor; and
adjusting weights used to weight the n-grams based on the output of the classifying step.

2. The method of claim 1, wherein embedding the input text in the latent space is calculated as a weighted sum over the embedded n-grams in the input text.

3. The method of claim 1, wherein a weight of each n-gram is modeled as a function of a relative position of each n-gram in the input text and an embedding representation of each n-gram.

4. The method of claim 1, wherein embedding the input text in the latent space further comprises:
dividing the input text into sub-parts;
forming an embedded representation of each of the sub-parts based on embedded n-grams in each respective sub-part; and
concatenating the sub-parts to form an embedded representation of the full input text.

5. The method of claim 4, wherein forming the embedded representation of each subpart includes calculating a weighted sum over the n-grams in the subpart.

6. The method of claim 1, wherein embedding the input text in the latent space comprises calculating a weighted sum over the n-grams in the input text.

7. The method of claim 1, wherein weights for each n-gram are learned by optimizing over a set of training documents with known class labels.

8. The method of claim 7, wherein the weights are learned using a stochastic gradient descent.

9. The method of claim 1, wherein classifying includes applying a classification having three or more classes.

10. A system for document classification, comprising:
an n-gram embedding module configured to embed n-grams from an input text in a latent space;
a document embedding module configured to embed the input the input text in the latent space based on the embedded n-grams, weighted according to a non-linear function $$q_j = \frac{1}{Q} \sum_{k=1}^{K} sigmoid\left(a_k \cdot \frac{j}{N} + b_k\right),$$

using a mixture model on a relative position of the n-grams in the input text, where $a_k$ and $b_k$ are parameters to be learned, $$Q = \sum_{j=1}^{N} q_j$$

and K specify a number of mixture quantities, sigmoid (•) is a non-linear transfer function, $q_j$ is the weight associated with a $j^{th}$ n-gram, j signifies the position of an n-ram in the input text and N is the position of a final n-gram in the input text;
 a classifier configured to classify the document along one or more axes using a processor; and
 a weight learning module configured to adjust the weights for the n-grams based on the output of the classifying step.

11. The system of claim 10, wherein the document embedding module is further configured to embed the input text in the latent space as a weighted sum over the embedded n-grams in the input text.

12. The system of claim 10, wherein the weight of an n-gram is modeled as a function of both a relative position of the n-gram in the document and an embedding representation of the n-gram.

13. The system of claim 10, wherein the document embedding module is further configured to:
 divide the input text into sub-parts;
 form an embedded representation of each of the sub-parts based on embedded n-grams in each respective sub-part; and
 concatenate the sub-parts to form an embedded representation of the full input text.

14. The system of claim 13, wherein the document embedding module is further configured to form the embedded representation of each subpart by calculating a weighted sum over the n-grams in the subpart.

15. The system of claim 10, wherein the document embedding module is further configured to form the embedded representation of each subpart by calculating a weighted sum over the n-grams in the subpart.

16. The system of claim 10, wherein the weight learning module is further configured to learn weights for each n-gram by optimizing over a set of training documents with known class labels.

17. The system of claim 16, wherein the weight learning module is configured to learn the weights using a stochastic gradient descent.

18. The system of claim 10, wherein the classifier is configured to apply a classification having three or more classes.

* * * * *